United States Patent [19]

Tsipursky et al.

[11] Patent Number: 5,849,830

[45] Date of Patent: *Dec. 15, 1998

[54] INTERCALATES AND EXFOLIATES FORMED WITH N-ALKENYL AMIDES AND/OR ACRYLATE-FUNCTIONAL PYRROLIDONE AND ALLYLIC MONOMERS, OLIGOMERS AND COPOLYMERS AND COMPOSITE MATERIALS CONTAINING SAME

[75] Inventors: Semeon Tsipursky, Lincolnwood; Gary W. Beall, McHenry; Elena I. Vinokour, Downers Grove, all of Ill.

[73] Assignee: AMCOL International Corporation, Arlington Heights, Ill.

[*] Notice: The term of this patent shall not extend beyond the expiration date of Pat. No. 5,552,469.

[21] Appl. No.: 951,094

[22] Filed: Oct. 15, 1997

Related U.S. Application Data

[63] Continuation-in-part of Ser. No. 637,092, May 2, 1996, Pat. No. 5,760,121, which is a continuation-in-part of Ser. No. 525,416, Sep. 8, 1995, Pat. No. 5,721,306, which is a continuation-in-part of Ser. No. 488,264, Jun. 7, 1995, Pat. No. 5,552,469, and a continuation-in-part of Ser. No. 488,263, Jun. 7, 1995, Pat. No. 5,698,624, and Ser. No. 480,080, Jun. 7, 1995, Pat. No. 5,578,672.

[51] Int. Cl.$^6$ .............................. C08J 5/10; C08K 3/34; C08L 33/00

[52] U.S. Cl. ........................ 524/450; 524/445; 524/447; 524/448; 524/449

[58] Field of Search .................................. 524/445, 447, 524/448, 449, 450, 503; 523/207, 209, 216

[56] References Cited

U.S. PATENT DOCUMENTS

| | | | |
|---|---|---|---|
| 2,035,546 | 3/1936 | Hamilton | 167/24 |
| 3,267,058 | 8/1966 | Hixenbaugh | 260/23 |
| 3,268,561 | 8/1966 | Peppel et al. | 260/348 |
| 3,419,460 | 12/1968 | Ure et al. | 161/162 |
| 3,419,517 | 12/1968 | Hendrick et al. | 260/37 |
| 3,423,341 | 1/1969 | Klare et al. | 260/22 |
| 3,457,324 | 7/1969 | Sekmakas | 260/834 |
| 3,483,152 | 12/1969 | Koch | 260/23.7 |
| 3,515,626 | 6/1970 | Duffield | 161/162 |
| 3,773,708 | 11/1973 | Takahashi et al. | 260/41 R |
| 3,795,650 | 3/1974 | Burns | 260/33.4 R |
| 3,912,532 | 10/1975 | Simone | 106/308 N |
| 3,929,678 | 12/1975 | Laughlin et al. | 252/526 |
| 4,125,411 | 11/1978 | Lyons | 106/291 |
| 4,210,572 | 7/1980 | Herman et al. | 260/404 |
| 4,251,576 | 2/1981 | Osborn et al. | 428/331 |
| 4,400,485 | 8/1983 | Mukamal et al. | 524/444 |
| 4,431,755 | 2/1984 | Weber et al. | 523/203 |
| 4,434,075 | 2/1984 | Mardis et al. | 252/315.2 |
| 4,472,538 | 9/1984 | Kamigaito et al. | 523/202 |
| 4,500,670 | 2/1985 | McKinley et al. | 524/445 |
| 4,546,145 | 10/1985 | Kishida et al. | 524/780 |
| 4,600,744 | 7/1986 | Libor et al. | 524/446 |
| 4,609,717 | 9/1986 | Greigger et al. | 528/45 |
| 4,613,542 | 9/1986 | Alexander | 428/290 |
| 4,618,703 | 10/1986 | Thanawalla | 560/209 |

(List continued on next page.)

FOREIGN PATENT DOCUMENTS

| | | |
|---|---|---|
| 0 205 281 A3 | 12/1986 | European Pat. Off. . |
| 0 335 653 A1 | 10/1989 | European Pat. Off. . |
| 0 358 415 A1 | 3/1990 | European Pat. Off. . |
| 0 479 031 A1 | 4/1992 | European Pat. Off. . |
| 0 548 940 A1 | 6/1993 | European Pat. Off. . |
| 0 761 739 A1 | 3/1997 | European Pat. Off. . |
| 1 642 122 | 7/1970 | Germany . |
| 1 146 668 | 3/1969 | United Kingdom . |
| 1 565 362 | 4/1980 | United Kingdom . |
| 0 645 181 A2 | 3/1995 | United Kingdom . |
| WO 93/04117 | 3/1993 | WIPO . |
| WO 93/04118 | 3/1993 | WIPO . |
| WO 93/11190 | 6/1993 | WIPO . |

OTHER PUBLICATIONS

C. W. Francis, "Adsorption of Polyvinylpyrrolidone on Reference Clay Minerals", Soil Science, vol. 115, No. 1, 1973, pp. 40–54.

A. Usuki, et al., "Synthesis of nylon 6–clay hybrid", J. Mater. Res., vol. 8, No. 5, May 1993, pp. 1179–1184.

Y. Kojima, et al., "Mechanical Properties of Nylon 6–Clay Hybrid", J. Mater. Res., vol. 8, No. 5, May 1993, 1185–1189.

K. Suzuki, et al., "Preparation Of Delaminated Clay Having a Narrow Micropore Distribution in the Presence Of Hydroxyaluminum Cations and Polyvinyl Alcohol", Clays and Clay Minerals, vol. 36, No. 2, 1988, pp. 147–152.

R. Levy, et al., "Interlayer Adsorption of Polyvinylpyrrolidone on Montmorillonite", Journal of Colloid and Interface Science, vol. 50, No. 3, Mar. 1975, pp. 442–450.

(List continued on next page.)

Primary Examiner—James J. Seidleck
Assistant Examiner—U. K Rajguru
Attorney, Agent, or Firm—Marshall, O'Toole, Gerstein, Murray & Borun

[57] ABSTRACT

Nanocomposites are manufactured by combining a host material, such as an organic solvent or a matrix polymer and exfoliated intercalates formed by contacting a phyllosilicate with an intercalant selected from the group consisting of (1) an N-alkenyl amide monomer and an allylic monomer; (2) an oligomer formed by copolymerizing an N-alkenyl amide monomer and an allylic monomer; (3) a polymer formed by copolymerizing an N-alkenyl amide monomer and an allylic monomer; and (4) mixtures thereof to adsorb or the intercalant between adjacent phyllosilicate platelets. Sufficient polymer is adsorbed between adjacent phyllosilicate platelets to expand the adjacent platelets to increase the spacing at least about 10 Å, preferably at least about 20 Å (as measured after water removal), up to about 100 Å and preferably in the range of about 30–40 Å, so that the intercalate easily can be exfoliated, e.g., when mixed with an organic solvent or a polymer melt, to provide a carrier material for drugs and the like, or to provide a matrix polymer/platelet composite (nanocomposite) material—the platelets being exfoliated from the intercalate.

28 Claims, No Drawings

U.S. PATENT DOCUMENTS

| | | | |
|---|---|---|---|
| 4,739,007 | 4/1988 | Okada et al. | 524/789 |
| 4,789,403 | 12/1988 | Rice | 106/417 |
| 4,798,766 | 1/1989 | Rice | 428/404 |
| 4,810,734 | 3/1989 | Kawasumi et al. | 523/216 |
| 4,842,651 | 6/1989 | Ravet et al. | 106/487 |
| 4,849,006 | 7/1989 | Knudson, Jr. | 71/64.11 |
| 4,875,762 | 10/1989 | Kato et al. | 350/357 |
| 4,889,885 | 12/1989 | Usuki et al. | 524/443 |
| 4,894,411 | 1/1990 | Okada et al. | 524/710 |
| 4,920,171 | 4/1990 | Hutton, Jr. et al. | 524/446 |
| 5,032,546 | 7/1991 | Giannelis et al. | 501/3 |
| 5,032,547 | 7/1991 | Giannelis et al. | 501/3 |
| 5,091,462 | 2/1992 | Fukui et al. | 524/504 |
| 5,102,948 | 4/1992 | Deguchi et al. | 524/789 |
| 5,164,440 | 11/1992 | Deguchi et al. | 524/444 |
| 5,164,460 | 11/1992 | Yano et al. | 624/445 |
| 5,204,078 | 4/1993 | Tateyama et al. | 424/331 |
| 5,206,284 | 4/1993 | Fukui et al. | 524/504 |
| 5,229,451 | 7/1993 | Carter et al. | 524/493 |
| 5,248,720 | 9/1993 | Deguchi et al. | 524/444 |
| 5,302,385 | 4/1994 | Khan et al. | 424/486 |
| 5,326,500 | 7/1994 | Friedman et al. | 252/378 |
| 5,340,558 | 8/1994 | Friedman et al. | 423/328.1 |
| 5,385,776 | 1/1995 | Maxfield et al. | 428/297 |
| 5,391,437 | 2/1995 | Miyasaka et al. | 428/425.5 |
| 5,414,042 | 5/1995 | Yasue et al. | 524/789 |
| 5,428,094 | 6/1995 | Tokoh et al. | 524/379 |
| 5,506,046 | 4/1996 | Andersen et al. | 524/446 |
| 5,508,072 | 4/1996 | Andersen et al. | 524/446 |
| 5,514,734 | 5/1996 | Maxfield et al. | 523/204 |
| 5,622,533 | 4/1997 | Sommese et al. | 44/620 |
| 5,625,076 | 4/1997 | Shimasaki et al. | 548/552 |
| 5,629,359 | 5/1997 | Peeters et al. | 522/96 |
| 5,667,886 | 9/1997 | Gough et al. | 428/331 |

OTHER PUBLICATIONS

D.J. Greenland, "Adsorption of Polyvinyl Alcohols by Montmorillonite", Journal of Colloid Science, 18, (1963) pp. 647–664.

R.A. Vaia, et al., "Synthesis and Properties of Two–Dimensional Nanostructures by Direct Intercalation of Polymer Melts in Layered Silicates", Chem. Mater. 1993, 5, pp. 1694–1696.

R.A. Vaia, et al., "New Polymer Electrolyte Nanocomposites; Melt Intercalation of Poly(ethylene oxide) in Mica–Type Silicates", Advanced Materials 1995, 7, No. 2, pp. 154–156.

A. Akelah, et al., "Synthesis and Characterization of Epoxyphilic montmorillonites", Clay Minerals (1994) 29, pp. 169–178.

C.E. Clapp, et al., "Adsorption Studies of a Dextran on Montmorillonite", Trans. 9th Int. Cong. Soil Sci., 1968, vol. 1, pp. 627–634.

H.G.G. Dekking, "Preparation and Properties of Some Polymer–Clay Compounds", Clays and Clay Minerals, 1964, 12, pp. 603–616.

A. Usuki, et al., "Charaterization and Properties of Nylon 6–Clay Hybrid", (source and date unknown), pp. 651–652.

G.W. Brindley, et al., "Preparation and Solvatio Properties of Some Variable Charge Montmorillonites", Clays and Clay Minerals, 1971, vol. 18, pp. 399–404.

A. Okada, et al., "A Solid State NMR Study on Crystalline Forms of Nylon 6", Journal of Applied Polymer Science, (1989), vol. 37, pp. 1363–1371.

A. Usuki, et al., Swelling Behavior of Montmorillonite Cation Exchanged For ω–Amino Acids by εCaprolactam, J. Mater. Res., vol. 8, No. 5, May 1993, pp. 1174–1178.

Y. Kojima, et al., "One–Pot Synthesis of Nylon 6–Clay Hybrid", Journal of Polymer Science: Part A: Polymer Chemistry, vol. 31, (1993), pp. 1755–1758.

Y. Kojima, et al., "Fine Structure of Nylon–6–Clay Hybrid", Journal of Polymer Science: Part B: Polymer Physics, vol. 32 (1994), pp. 625–630.

B.K.G. Theng, "Clay–Polymer interactions; Sumary and Perspectives", Clays and Clay Minerals, vol. 30, No. 1 (1982) pp. 1–9.

Sugahara, et al., "Clay–Organic Nano–Composite; Preparation of a Kaolinte–Poly(vinylpyrrolidone) Intercalation Compound", Journal of Ceramic Society of Japan, International Edition, vol. 100, No. 4, Apr. 1, 1992, pp. 420–423.

Ogawa, et al., "Prepartion of Montmorillonite–Polyacrylamide Intercalation Compounds and The Water Absorbing Property", Clay Science, vol. 7, 1989 Tokyo, Japan, pp. 243–251.

Wu, et al., "Structural, thermal, and electrical characterization of layered nanocomposites derived from sodium–montmorillonite and polyethers", Chemical Abstracts, vol. 119, No. 4, Jul. 26, 1993 Columbus, Ohio, US, Abstract No. 31017r.

Bujdak, et al., "The reaction of montmorillonite with octadecylamine in solid and melted state", Chemical Abstracts, vol. 118, No. 26, Abstract No. 257609b, p. 166 (28 Jun. 1993), Columbus, Ohio (US).

Yano, et al., "Synthesis and Properties of Polyimide–Clay Hybrid", Polymer Preprints, ACS, April 1991, pp. 65–66.

Giannelis, et al., "Synthesis and Processing of Ceramics: Scientific Issues", Materials Research Society Symposium Proceedings, vol. 249 (1992), pp. 547–558.

Sanchez Camazano, M. et al., "Factors influencing interactions of organophosphorus pesticides with montmorillonite", Chemical Abstracts, vol. 98, No. 19, 9 May 1983, Columbus, Ohio, US, Abstracts No. 156367.

T. Lan et al., "Clay–Epoxy Nanocomposites:Relationships Between Reinforcement Properties and the Extent of Clay Layer Exfoliation", Polym. Mater. Sci. Eng., vol. 73, 296–297 (1995).

INTERCALATES AND EXFOLIATES FORMED WITH N-ALKENYL AMIDES AND/ OR ACRYLATE-FUNCTIONAL PYRROLIDONE AND ALLYLIC MONOMERS, OLIGOMERS AND COPOLYMERS AND COMPOSITE MATERIALS CONTAINING SAME

CROSS-REFERENCE TO RELATED APPLICATIONS

This application is a continuation-in-part of U.S. patent application Ser. No. 08/637,092 filed May 2, 1996, U.S. Pat. No. 5,760,121 which is a continuation-in-part of U.S. patent application Ser. Nos. 08/525,416 filed Sep. 8, 1995, U.S. Pat. No. 5,721,306, which is a continuation-in-part of U.S. application Ser. No. 08/488,264 filed Jun. 7, 1995, U.S. Pat. No. 5,552,469, and Ser. No. 08/488,263 filed Jun. 7, 1995. U.S. patent application Ser. No. 08/525,416 is a continuation-in-part of U.S. patent application Ser. Nos. 08/488,264 filed Jun. 7, 1995, U.S. Pat. No. 5,552,469; 08/488,263 filed Jun. 7, 1995 now U.S. Pat. No. 5,698,624 and 08/480,080 filed Jun. 7, 1995, U.S. Pat. No. 5,578,672.

FIELD OF THE INVENTION

The present invention is directed to intercalated layered materials, and exfoliates thereof, manufactured by sorption (adsorption and/or absorption) of one or more oligomers or polymers between planar layers of a swellable layered material, such as a phyllosilicate or other layered material, to expand the interlayer spacing of adjacent layers at least about 10 Angstroms. More particularly, the present invention is directed to intercalates having at least two layers of monomer, oligomer and/or polymer molecules sorbed on the internal surfaces of adjacent layers of the planar platelets of a layered material, such as a phyllosilicate, preferably a smectite clay, to expand the interlayer spacing at least about 10 Angstroms, more preferably at least about 20 Angstroms, and most preferably to at least about 30–45 Angstroms, up to about 100 Å, or disappearance of periodicity. The resulting intercalates are neither entirely organophilic nor entirely hydrophilic, but a combination of the two, and easily can be exfoliated for or during admixture with a thermoplastic or thermosetting matrix polymer melt, preferably a thermoplastic matrix polymer, to improve one or more properties of the matrix polymer. The resulting matrix polymer/platelet composite materials are useful wherever polymer/filler composite materials are used, for example, as external body parts for the automotive industry; heat-resistant polymeric automotive parts in contact with an engine block; tire cord for radial tires; food wrap having improved gas impermeability; electrical components; food grade drink containers; and any other use where it is desired to alter one or more physical properties of a matrix polymer, such as elasticity and temperature characteristics, e.g., glass transition temperature and high temperature resistance.

BACKGROUND OF THE INVENTION AND PRIOR ART

It is well known that phyllosilicates, such as smectite clays, e.g., sodium montmorillonite and calcium montmorillonite, can be treated with organic molecules, such as organic ammonium ions, to intercalate the organic molecules between adjacent, planar silicate layers, thereby substantially increasing the interlayer (interlaminar) spacing between the adjacent silicate layers. The thus-treated, intercalated phyllosilicates then can be exfoliated, e.g., the silicate layers are separated, e.g., mechanically, by high shear mixing. The individual silicate layers, when admixed with a matrix polymer, before, after or during the polymerization of the matrix polymer, e.g., a polyamide—see 4,739, 007; 4,810,734; and 5,385,776—have been found to substantially improve one or more properties of the polymer, such as mechanical strength and/or high temperature characteristics.

Exemplary of such prior art composites, also called "nanocomposites", are disclosed in published PCT disclosure of Allied Signal, Inc. WO 93/04118 and U.S. Pat. No. 5,385,776, disclosing the admixture of individual platelet particles derived from intercalated layered silicate materials, with a polymer to form a polymer matrix having one or more properties of the matrix polymer improved by the addition of the exfoliated intercalate. As disclosed in WO 93/04118, the intercalate is formed (the interlayer spacing between adjacent silicate platelets is increased) by adsorption of a silane coupling agent or an onium cation, such as a quaternary ammonium compound, having a reactive group which is compatible with the matrix polymer. Such quaternary ammonium cations are well known to convert a highly hydrophilic clay, such as sodium or calcium montmorillonite, into an organophilic clay capable of sorbing organic molecules. A publication that discloses direct intercalation (without solvent) of polystyrene and poly (ethylene oxide) in organically modified silicates is *Synthesis and Properties of Two-Dimensional Nanostructures by Direct Intercalation of Polymer Melts in Layered Silicates*, Richard A. Vaia, et al., Chem. Mater., 5:1694–1696(1993). Also as disclosed in Adv. Materials, 7, No. 2: (1985), pages 154–156, *New Polymer Electrolyte Nanocomposites: Melt Intercalation of Poly(Ethylene Oxide)* in Mica-Type Silicates, Richard A. Vaia, et al., poly(ethylene oxide) can be intercalated directly into Na-montmorillonite and Li-montmorillonite by heating to 80° C. for 2–6 hours to achieve a d-spacing of 17.7 Å. The intercalation is accompanied by displacing water molecules, disposed between the clay platelets with polymer molecules. Apparently, however, the intercalated material could not be exfoliated and was tested in pellet form. It was quite surprising to one of the authors of these articles that exfoliated material could be manufactured in accordance with the present invention.

Previous attempts have been made to intercalate polyvinylpyrrolidone (PVP), polyvinyl alcohol (PVA) and poly (ethylene oxide) (PEO) between montmorillonite clay platelets with little success. As described in Levy, et al., *Interlayer Adsorption of Polyvinylpyrrolidone on Montmorillonite*, Journal of Colloid and Interface Science, Vol. 50, No. 3, March 1975, pages 442–450, attempts were made to sorb PVP (40,000 average M.W.) between monoionic montmorillonite clay platelets (Na, K, Ca and Mg) by successive washes with absolute ethanol, and then attempting to sorb the PVP by contact with 1% PVP/ethanol/ water solutions, with varying amounts of water, via replacing the ethanol solvent molecules that were sorbed in washing (to expand the platelets to about 17.7 Å). Only the sodium montmorillonite had expanded beyond a 20 A basal spacing (e.g., 26 Å and 32 Å), at $5^+$% $H_2O$, after contact with the PVP/ethanol/$H_2O$ solution. It was concluded that the ethanol was needed to initially increase the basal spacing for later sorption of PVP, and that water did not directly affect the sorption of PVP between the clay platelets (Table II, page 445), except for sodium montmorillonite. The sorption was time consuming and difficult and met with little success.

Further, as described in Greenland, Adsorption of Polyvinyl Alcohols by Montmorillonite, Journal of Colloid Sciences, Vol. 18, pages 647–664 (1963), polyvinyl alcohols containing 12% residual acetyl groups could increase the basal spacing by only about 10 Å due to the sorbed polyvinyl alcohol (PVOH). As the concentration of polymer in the intercalant polymer-containing solution was increased from 0.25% to 4%, the amount of polymer sorbed was substantially reduced, indicating that sorption might only be effective at polymer concentrations in the intercalant polymer-containing composition on the order of 1% by weight polymer, or less. Such a dilute process for intercalation of polymer into layered materials would be exceptionally costly in drying the intercalated layered materials for separation of intercalate from the polymer carrier, e.g., water, and, therefore, apparently no further work was accomplished toward commercialization.

In accordance with one important feature of the present invention, best results are achieved using a monomer, an oligomer (herein defined as a pre-polymer having 2 to about 15 recurring monomeric units, which can be the same or different) or polymer (herein defined as having more than about 15 recurring monomeric units, which can be the same or different) composition for intercalation having at least about 2%, preferably at least about 5% by weight intercalant monomer, intercalant oligomer or intercalant polymer concentration, more preferably about 50% to about 80% by weight monomer, oligomer and/or polymer, based on the weight of monomer, oligomer and/or polymer and carrier (e.g., water and/or an organic solvent for the intercalant monomer, intercalant oligomer or intercalant polymer) to achieve better sorption of the intercalant monomers, oligomers or polymers between phyllosilicate platelets and so that less drying is required after intercalation. The monomer, oligomer or polymer sorbed between silicate platelets that causes separation or added spacing between adjacent silicate platelets and, for simplicity of description, the monomers, oligomers and polymers are hereinafter called the "intercalant", or "intercalant monomer", or "intercalant polymer". In this manner, water-soluble or water-insoluble oligomers or polymers will be sorbed sufficiently to increase the interlayer spacing of the phyllosilicate in the range of about 10 Å to about 100 Å, for easier and more complete exfoliation, in a commercially viable process, regardless of the particular phyllosilicate or intercalant polymer.

In accordance with an important feature of the present invention, best results are achieved using a water-soluble or water-insoluble monomer, or oligomer (herein defined as a pre-polymer having 2 to about 15 recurring monomeric units, which can be the same or different) or polymer (herein defined as having more than about 15 recurring monomeric units, which can be the same or different) composition for intercalation having at least about 2%, preferably at least about 50 by weight, more preferably at least about 10% by weight intercalant monomer, intercalant oligomer or intercalant polymer concentration, most preferably about 30% to about 80% by weight monomer and/or oligomer and/or polymer, based on the weight of intercalant monomer, oligomer and/or polymer and carrier (e.g., water with or without an organic solvent for the intercalant monomer, oligomer or intercalant polymer) to achieve better sorption of the intercalant polymers between phyllosilicate platelets. Regardless of the concentration of intercalant monomer and/or polymer in liquid solvent of the intercalating composition, the intercalating composition should have an intercalant:layered material ratio of at least 1:20, preferably at least 1:10, more preferably at least 1:5, and most preferably about 1:4 to achieve efficient intercalation of the monomer or polymer between adjacent platelets of the layered material. The intercalant monomer, oligomer or polymer sorbed between and permanently bonded to the silicate platelets causes separation or added spacing between adjacent silicate platelets and, for simplicity of description, the intercalant monomers, oligomers and polymers are hereinafter called the "intercalant" or "intercalant monomer", or "intercalant polymer". In this manner, the oligomers or polymers will be sorbed sufficiently to increase the interlayer spacing of the phyllosilicate in the range of about 10 Å to about 100 Å for easier and more complete exfoliation, in a commercially viable process, regardless of the particular phyllosilicate or intercalant polymer.

A phyllosilicate, such as a smectite clay, can be intercalated sufficiently for subsequent exfoliation by sorption of monomers, oligomers or polymers that have carbonyl, hydroxyl, carboxyl, amine, amide, ether, ester, sulfate, sulfonate, sulfinate, sulfamate, phosphate, phosphonate, phosphinate functionalities, or aromatic rings to provide metal cation chelate-type bonding between two functional groups of one or two intercalant polymer molecules and the metal cations bonded to the inner surfaces of the phyllosilicate platelets. Sorption and metal cation electrostatic attraction or bonding of a platelet metal cation between two oxygen or nitrogen atoms of the intercalant molecules; or the electrostatic bonding between the interlayer cations in hexagonal or pseudohexagonal rings of the smectite layers and an intercalant monomer, oligomer or polymer aromatic ring structure increases the interlayer spacing between adjacent silicate platelets or other layered material at least about 10 Å, preferably at least about 20 Å, and most preferably in the range of about 30 Å to about 45 Å. Such intercalated phyllosilicates easily can be exfoliated into individual phyllosilicate platelets.

Depending upon the conditions that the composition is subjected to during intercalation and exfoliation, particularly temperature; pH; and amount of water contained in the intercalating composition, the intercalate and/or exfoliate/carrier composition can be formed to any desired viscosity, e.g., at least about 100 centipoises, preferably at least about 500–1000 centipoises, whether or not gelled, and particularly to extremely high viscosities of about 5,000 to about 5,000,000 centipoises. The compositions are thixotropic so that shearing will lower viscosity for easier delivery, and then by reducing shear or eliminating shear, the compositions will increase in viscosity. The intercalant monomer, oligomer or polymer intercalates between the spaces of adjacent platelets of the layered material for easy exfoliation, and complexes with the metal cations on the platelet surfaces where the intercalant remains after the intercalate, or exfoliate thereof, is combined with the carrier/solvent or added to a polymer melt. It is theorized that the intercalant coating on the surfaces of the clay platelets is ionically complexed with interlayer cations and participates (aids) in the viscosification and thixotropy of the carrier/solvent composition and adds significant strength, vapor impermeability and temperature characteristics to a matrix polymer. However, other forms of bonding such as hydrogen bonding or Van Der Waals forces or molecular complexing also may be responsible for the adherence of the intercalant to the surfaces of the layered material, either entirely, or in part.

DEFINITIONS

Whenever used in this Specification, the terms set forth shall have the following meanings:

Layered Material,, shall mean an inorganic material, such as a smectite clay mineral, that is in the form of a plurality of adjacent, bound layers and has a thickness, for each layer, of about 3 Å to about 50 Å, preferably about 10 Å.

"Platelets" shall mean individual layers of the Layered Material.

"Intercalate" or "Intercalated" shall mean a Layered Material that includes oligomer and/or polymer molecules disposed between adjacent platelets of the Layered Material to increase the interlayer spacing between the adjacent platelets to at least about 10 Å, preferably at least about 20 Å.

"Intercalation" shall mean a process for forming an Intercalate.

"Intercalant Monomer" shall mean a mixture of an N-alkenyl amide, such as N-vinyl lactam, and an allylic monomer capable of copolymerizing before or after Intercalation between adjacent platelets of a Layered Material.

"Intercalant Polymer" or "Intercalant Oligomer" or "Intercalant" shall mean an oligomer or polymer polymerized from the Intercalant Monomer mixture that is sorbed between Platelets of the Layered Material and complexes with the platelet surfaces to form an Intercalate.

"Intercalating Carrier" shall mean a carrier comprising water with or without an organic solvent used together with an Intercalant Monomer, Intercalant Oligomer or an Intercalant Polymer to form an Intercalating Composition capable of achieving Intercalation of the Layered Material.

"Intercalating Composition" shall mean a composition comprising an Intercalant Monomer, and/or an Intercalant Oligomer and/or an Intercalant Polymer, an Intercalating Carrier for the Intercalant Monomer or Intercalant Polymer, and a Layered Material.

"Exfoliate" or "Exfoliated" shall mean individual platelets-of an Intercalated Layered Material so that adjacent platelets of the Intercalated Layered Material can be dispersed individually throughout a matrix polymer, or throughout a carrier material, such as water, an alcohol or glycol, or any other organic solvent.

"Exfoliation" shall mean a process for forming an Exfoliate from an Intercalate.

"Nanocomposite" shall mean an oligomer, polymer or copolymer having dispersed therein a plurality of individual platelets obtained from an Exfoliated, Intercalated Layered Material.

"Matrix Polymer" shall mean a thermoplastic or thermosetting polymer in which the Intercalate and/or Exfoliate is dispersed to form a Nanocomposite.

SUMMARY OF THE INVENTION

In brief, the present invention is directed to intercalates formed by contacting a layered phyllosilicate with an intercalant monomer, an intercalant oligomer and/or an intercalant polymer to sorb or intercalate in the intercalant monomer and/or polymer or mixtures of intercalant monomers and intercalant polymers between adjacent phyllosilicate platelets. Sufficient intercalant monomer, oligomer and/or polymer is sorbed between adjacent phyllosilicate platelets to expand the spacing between adjacent platelets (interlayer spacing) a distance of at least about 10 Å, preferably to at least about 20 Å (as measured after water removal) and more preferably in the range of about 30–45 Å, so that the intercalate easily can be exfoliated, sometimes naturally, without shearing being necessary. At times, the intercalate requires shearing that easily can be accomplished, e.g., when mixing the intercalate with a polymer melt, to provide a matrix polymer/platelet composite material or nanocomposite—the platelets being obtained by exfoliation of the intercalated phyllosilicate.

The intercalant monomer, oligomer and/or polymer has an affinity for the phyllosilicate so that it is sorbed between, and is maintained associated with the silicate platelets in the interlayer spaces, and after exfoliation. It is hereby theorized that monomer and polymer binding to the platelet surfaces is by metal cation electrostatic bonding or complexing, e.g., chelation, of the metal cations of the phyllosilicate sharing electrons with two carbonyl, two carboxyl, two hydroxyl, and/or two amide functionalities of one intercalant polymer molecule, or of two adjacent intercalant polymer molecules to an inner surface of the phyllosilicate platelets. Such intercalants have sufficient affinity for the phyllosilicate platelets to provide sufficient interlayer spacing for exfoliation, e.g., about 10 Å–100 Å, preferably about 10 Å–50 Å, and to maintain attachment to the surfaces of the platelets, without the need for coupling agents or spacing agents, such as the onium ion or silane coupling agents disclosed in the above-mentioned prior art.

Sorption of the intercalant should be sufficient to achieve expansion of adjacent platelets of the layered material (when measured dry—having a maximum of about 5% by weight water) to an interlayer spacing of at least about 10 Å, preferably a spacing of at least about 20 Å, more preferably a spacing of about 30–45 Å. To achieve intercalates that can be exfoliated easily using the preferred intercalants disclosed herein, the weight ratio of intercalant monomer, oligomer and/or polymer to layered material, preferably a water-swellable smectite clay such as sodium bentonite, in the intercalating composition contacting the phyllosilicate should be at least about 1:20, preferably at least about 1:12 to 1:10, more preferably at least about 1:5, and most preferably about 1:5 to about 1:3. It is preferred that the concentration of intercalant monomer and/or intercalant oligomer and/or intercalant polymer in the intercalating composition, based on the total weight of intercalant monomer and/or intercalant oligomer and/or intercalant polymer plus intercalant carrier (water plus any organic liquid solvent) in the intercalating composition is at least about 15% by weight, more preferably at least about 20% by weight intercalant, for example about 20%–30% to about 90% by weight intercalant monomer, intercalant oligomer or intercalant polymer, based on the weight of intercalant plus intercalant carrier (water plus any organic solvent) in the intercalating composition during intercalation.

It has been found that the intercalates of the present invention are increased in interlayer spacing step-wise. If the phyllosilicate is contacted with an intercalant monomer-containing composition, or intercalant oligomer-containing composition, or intercalant polymer-containing composition containing less than about 16% by weight intercalant, e.g., 10% to about 15% by weight intercalant, based on the dry weight of the phyllosilicate, a monolayer width of intercalant is sorbed (intercalated) between the adjacent platelets of the layered material. A monolayer of intercalant intercalated between platelets increases the interlayer spacing to about 10 Å to less than 20 Å. When the amount of intercalant is in the range of about 16% to less than about 35% by weight, based on the weight of the dry layered material, the intercalant is sorbed in a bilayer, thereby increasing the interlayer spacing to about 10 Å to about 16 Å. At an intercalant loading in the intercalant-containing composition of about 35% to less than about 55% intercalant, based on the dry weight of the layered material contacted, the interlayer spacing is increased to about 20 Å to about 25 Å, corresponding to three layers of intercalant sorbed between adjacent platelets of the layered material. At an intercalant loading of about 55% to about 80% intercalant, based on the dry weight of the layered material dissolved or dispersed in the intercalating composition, the interlayer spacing will be increased to about 30 Å to about 35 Å, corresponding to 4 and 5 layers of intercalant sorbed (intercalated) between adjacent platelets of the layered material.

Such interlayer spacings have never been achieved by direct intercalation of a monomer, an oligomer or polymer molecule, without prior interlayer sorption of a swelling agent, such as an onium or silane coupling agent, and provides easier and more complete exfoliation for or during incorporation of the platelets into a thermoplastic or thermosetting matrix polymer. Such intercalates are especially useful in admixture with matrix thermoplastic or thermosetting polymers in the manufacture of polymeric articles from the polymer/platelet composite materials; and for admixture of the intercalates and exfoliated intercalates with polar solvents in modifying rheology, e.g., of cosmetics, oil-well drilling fluids, paints, lubricants, especially food grade lubricants in the manufacture of oil and grease, and the like.

Once exfoliated, the platelets of the intercalate are predominantly completely separated into individual platelets having intercalant molecules complexed with the platelet surfaces, and the originally adjacent platelets no longer are retained in a parallel, spaced disposition, but are free to move as predominantly individual, intercalant coated (continuously or discontinuously) platelets throughout a carrier or throughout a matrix polymer melt to act similar to a nanoscale filler material for the matrix polymer. The predominantly individual phyllosilicate platelets, having their platelet surfaces complexed with intercalant, e.g., polymer molecules, are randomly, homogeneously and uniformly dispersed throughout a carrier, such as water or an organic liquid, or throughout a polymer melt. Once a matrix polymer/platelet composite material is set and hardened into a desired shape, the predominantly individual phyllosilicate platelets are permanently fixed in position and are randomly, homogeneously and uniformly dispersed, predominantly as individual platelets, throughout the matrix polymer/platelet composite material.

As recognized, the thickness of the exfoliated, individual platelets (about 10 Å) is relatively small compared to the size of the flat platelet faces. The platelets have an aspect ratio in the range of about 200 to about 2,000. Dispersing such finely divided platelet particles into a polymer melt provides a very large area of contact between polymer and platelet particles, for a given volume of particles in the composite, and a high degree of platelet homogeneity in the composite material. Platelet particles of high strength and modulus, dispersed at sub-micron size (nanoscale), impart greater mechanical reinforcement and a higher glass transition temperature (Tg) to the polymer matrix than do comparable loadings of conventional reinforcing fillers of micron size, and can impart lower permeability to matrix polymers than do comparable loadings of conventional fillers.

While the nanocomposites disclosed in WO 93/04118 require a swelling/compatibilizing agent, such as a silane coupling agent, or a quaternary ammonium molecule, that has distinct bonding interactions with both the polymer and the platelet particle to achieve improved properties in the polymer, the intercalants used to form the intercalates and exfoliates in accordance with the present invention need not have any (but can include) reactivity with the matrix polymer in which the inventive intercalates and exfoliates are dispersed, while improving one or more properties of the matrix polymer.

DETAILED DESCRIPTION OF THE PREFERRED EMBODIMENTS

To form the intercalated materials of the present invention, the phyllosilicate should be swelled or intercalated by sorption of a mixture of an N-alkenyl amide intercalant monomer and an allylic intercalant monomer for copolymerization in-situ (while intercalated between adjacent silicate platelets after intercalation); or intercalated by co-sorption of a co-oligomer or copolymer formed by polymerization of a mixture of an N-alkenyl amide intercalant monomer and an allylic intercalant monomer. In accordance with a preferred embodiment of the present invention, the phyllosilicate should include at least 4% by weight water, up to about 5000% water, based on the dry weight of the phyllosilicate, preferably about 7% to about 100% water, more preferably about 25% to about 50% by weight water, prior to or during contact with the intercalant to achieve sufficient intercalation for exfoliation. Preferably, the phyllosilicate should include at least about 4% by weight water before contact with the intercalating carrier for efficient intercalation. The amount of intercalant in contact with the phyllosilicate from the intercalating composition, for efficient exfoliation, should provide an intercalant/phyllosilicate weight ratio (based on the dry weight of the phyllosilicate) of at least about 1:20, preferably at least about 3.2:20, and more preferably about 4–14:20, to provide efficient sorption and complexing (intercalation) of the intercalant between the platelets of the layered material, e.g., phyllosilicate, (preferably about 16% to about 70% by weight intercalant, based on the dry weight of the layered silicate material).

The intercalants are introduced in the form of a solid or liquid composition (neat or aqueous solution or dispersion, and/or with an organic solvent, e.g., hydroalcoholic) having an intercalant concentration of at least about 2%, preferably at least about 5% by weight intercalant, more preferably at least about 50% to about 100% by weight intercalant in the intercalant/carrier composition contacting the layered material for intercalant sorption. The intercalant can be water-soluble, water-insoluble or partially water-soluble and can be added as a liquid or solid with the addition to the layered material/intercalant blend of at least about 20% water, e.g., about 20% to about 80% water, preferably at least about 30% water to about 5000% water and/or other solvent for the intercalant, based on the dry weight of layered material plus intercalant, preferably about 30% to about 50% water or other solvent, so that less water or solvent is sorbed by the intercalate, thereby necessitating less drying energy after intercalation. The intercalant may be introduced into the spaces between every layer, nearly every layer, or at least a predominance of the layers of the layered material such that the subsequently exfoliated platelet particles are preferably, predominantly less than about 5 layers in thickness; more preferably, predominantly about 1 or 2 layers in thickness; and most preferably, predominantly single platelets.

Any swellable layered material that sufficiently sorbs the intercalant to increase the interlayer spacing between adjacent phyllosilicate platelets to at least about 10 Å, preferably at least about 20 Å (when the phyllosilicate is measured dry—having a maximum of about 5% by weight water) may be used in the practice of this invention. Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered materials include micaceous minerals, such as illite and mixed layered illite/smectite minerals, such as ledikite and admixtures of illites with the clay minerals named above.

Other layered materials having little or no charge on the layers may be useful in this invention provided they can be intercalated with the intercalant polymers to expand their interlayer spacing at least about 10 Å, preferably at least about 20 Å. Preferred swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

As used herein the "interlayer spacing" refers to the distance between the internal faces of the adjacent dry silicate layers as they are assembled in the layered material before any delamination (exfoliation) takes place. The interlayer spacing is measured when the layered material is "air dry", e.g., contains about 3–10% by weight water, preferably about 3–6% by weight water, based on the dry weight of the layered material. The preferred clay materials generally include interlayer cations such as $Na^+$, $Ca^{+2}$, $K^+$, $Mg^{+2}$, $NH_4^+$ and the like, including mixtures thereof.

The amount of intercalant monomer and/or intercalant oligomer and/or intercalant polymer intercalated into the interlayer spaces of the swellable layered materials useful in this invention, in order that the intercalated layered material may be exfoliated or delaminated into individual platelets, may vary substantially between about 10% and about 100%, generally between about 10% and about 80%, based on the dry weight of the layered silicate material. In the preferred embodiments of the invention, amounts of intercalants employed, with respect to the dry weight of layered material being intercalated, will preferably range from at least about 8 grams of intercalant/100 grams of layered material (dry basis), more preferably at least about 10 grams of intercalant/100 grams of layered material, to about 80–90 grams intercalant/100 grams of layered material (dry basis). More preferred amounts are from about 20 grams intercalant/100 grams of layered material to about 60 grams intercalant/100 grams of layered material (dry basis).

The intercalants are introduced into (sorbed within) the interlayer spaces of the layered material in one of two ways. In a preferred method of intercalating, the layered material is intimately mixed, e.g., by extrusion, with a concentrated intercalant or intercalant/water solution, or intercalant/organic solvent, e.g., ethanol solution. To achieve the best intercalation for exfoliation, the layered material/intercalant blend contains at least about 80 by weight intercalant, preferably at least about 10% by weight intercalant, based on the dry weight of the layered material. The intercalating carrier (preferably water, with or without an organic solvent, e.g., ethanol) can be added by first solubilizing or dispersing the intercalant in the carrier; or the dry intercalant and relatively dry phyllosilicate (preferably containing at least about 4% by weight water) can be blended and the intercalating carrier added to the blend, or to the phyllosilicate prior to adding the dry intercalant. In every case, it has been found that surprising sorption and complexing of intercalant between platelets is achieved at relatively low loadings of intercalating carrier, especially $H_2O$, e.g., about 4% by weight water, based on the dry weight of the phyllosilicate.

When intercalating the phyllosilicate in slurry form (e.g., 900 pounds water, 100 pounds phyllosilicate, 25 pounds intercalant) the amount of water can vary from a preferred minimum of at least about 300 by weight water, with no upper limit to the amount of water in the intercalating composition (the phyllosilicate intercalate is easily separated from the intercalating composition).

Alternatively, the intercalating carrier, e.g., water, with or without an organic solvent, can be added directly to the phyllosilicate prior to adding the intercalant, either dry or in solution. Sorption of the intercalant molecules may be performed by exposing the layered material to dry or liquid intercalant compositions containing at least about 20 by weight, preferably at least about 5% by weight intercalant, more preferably at least about 50% intercalant, based on the dry weight of the layered material. Sorption may be aided by exposure of the intercalating composition to heat, pressure, ultrasonic cavitation, or microwaves.

In accordance with another method of intercalating the intercalant molecules between the platelets of the layered material and exfoliating the intercalate, the layered material, containing at least about 4% by weight water, preferably about 10% to about 15% by weight water, is blended with a solubilized intercalant (in a water and/or organic solvent carrier) in a ratio sufficient to provide at least about 8% by weight, preferably at least about 10% by weight intercalant, based on the dry weight of the layered material. The blend then preferably is extruded for faster intercalation. Further, the blend can be heated to at least the melt temperature of the intercalant, and preferably at least about 40°–50° C. above the intercalant melt temperature for faster intercalation.

In accordance with one important embodiment of the present invention, the polymerizable intercalant monomers and/or oligomers can be intercalated between the platelets of the layered material, or simply admixed with the exfoliated layered material, and the polymerizable monomer(s) and/or oligomer(s) are polymerized while intercalated between platelets, or while in contact with the intercalate or exfoliated intercalate.

To achieve the full advantage of the present invention the polymerizable monomer(s), and copolymers polymerized therefrom, include recurring units of an N-alkenyl amide and one or more allylic monomers selected from the group consisting of allylic alcohols, allyl esters, allyl ethers, and alkoxylated allylic alcohols. Optionally, one or more additional ethylenic monomers can be included. The monomers copolymerize (before or after intercalation) to provide resins that are easily produced without the need for reaction solvents to control the rate of polymerization and without the need for chain-transfer agents to limit molecular weight.

The resin intercalants offer valuable advantages for silicate filled thermoset coatings, sealants, elastomers, adhesives, and foams, as well as for composite materials containing the intercalates and exfoliates having the resins complexed to the silicate platelet surfaces. In composites, the resins offer good performance in a less-expensive alternative to commercially available intercalants made by interclation of more expensive water-soluble polymers, such as poly(N-vinylpyrrolidone). In coatings and other thermoset applications, the intercalates, exfoliates thereof and composite materials manufactured by intercalating layered materials with these copolymer resins offer oil resistance, enhanced hydrophilicity, and a reduced dependence on salt content for water solubility.

N-alkenyl amides useful in the invention are compounds that have a substituted or unsubstituted carbon-carbon double bond attached directly to nitrogen of an amide. Preferred N-alkenyl amides have the general structure: $R_1$—

(C=O)—NR$_2$—C(R$_3$)=C(R$_4$)R$_5$ in which each of R$_1$, R$_2$, R$_3$, R$_4$, and R$_5$ separately represents a member selected from the group consisting of hydrogen and C$_1$-C$_6$ alkyl. R$_1$ and R$_2$ may form a ring to give an alkenyl-lactam. Suitable alkenyl amides include, for example, N-vinylformamide, N-vinyl-N-methylacetamide, N-vinyl-N-methylpropanamide, and the like, and mixtures thereof. Other suitable N-alkenyl amides are described in U.S. Pat. Nos. 5,622,533 and 5,625,076, the teachings of which are incorporated herein by reference.

Preferred N-alkenyl amides include N-vinyl-lactams, which are cyclic amides that have a vinyl group (CH$_2$=CH—) attached to the nitrogen atom of the amide moiety. The lactam preferably has from 4 to 10 ring atoms. More preferably, the lactam has from 5 to 7 ring atoms. Suitable N-vinyl-lactams include, for example, N-vinylpropiolactam, N-vinylpyrroidone, N-vinyl-valerolactam, N-vinylcaprolactam, and the like, and mixtures thereof. N-vinylpyrrolidone and N-vinylcaprolactam are particularly preferred.

In addition to or in place of the N-alkenyl amide, resins of the invention can incorporate recurring units of an acrylate-functionalized pyrrolidone. Suitable acrylate-functionalized pyrrolidones include ester reaction products of N-2-hydroxyalkylpyrrolidones and acrylic or methacrylic acid. Suitable acrylate-functionalized pyrrolidones also include ester reaction products of N-polyether pyrrolidones and acrylic or methacrylic acid. Examples of these and other useful acrylate-functionalized pyrrolidones appear in U.S. Pat. No. 5,629,359, the teachings of which are incorporated by reference.

Copolymer resin intercalants incorporate one or more allylic monomers. Suitable allylic monomers include allylic alcohols, allyl esters, allyl ethers, and alkoxylated allylic alcohols. Allylic alcohols useful in making the intercalants of the present invention preferably have the general structure CH$_2$=CR—CH$_2$—OH in which R is selected from the group consisting of hydrogen and C$_1$-C$_5$ alkyl. Suitable allylic alcohols include, but are not limited to, allyl alcohol, methallyl alcohol, 2-ethyl-2-propen-1-ol, and the like, and mixtures thereof. Allyl alcohol and methallyl alcohol are preferred.

Allyl esters suitable in making the intercalants of the present invention preferably have the general structure: CH2—CR'—CH$_2$—O—CO—R in which R is hydrogen or a saturated or unsaturated linear, branched, or cyclic C$_1$-C$_{30}$ alkyl, aryl, or aralkyl group, and R' is selected from the group consisting of hydrogen and C$_1$-C$_5$ alkyl. Suitable allyl esters include, for example, allyl formate, allyl acetate, allyl butyrate, allyl benzoate, methallyl acetate, allyl fatty esters, and the like, and mixtures thereof. Particularly preferred are allyl esters derived from allyl alcohol and methallyl alcohol. Most preferred are C$_1$-C$_5$ alkyl esters of allyl alcohol and methallyl alcohol.

Preferred allyl ethers have the general structure: CH$_2$—CR'—CH$_2$—O—R in which R is a saturated linear, branched, or cyclic C$_1$-C$_{30}$ alkyl, aryl, or aralkyl group, and R' is selected from the group consisting of hydrogen and C$_1$-C$_5$ alkyl. Suitable allyl ethers include, for example, allyl methyl ether, allyl ethyl ether, allyl tert-butyl ether, allyl methylbenzyl ether, and the like, and mixtures thereof.

The copolymer resin intercalants of the present invention can incorporate recurring units of an alkoxylated allylic alcohol. Preferred alkoxylated allylic alcohols have the general structure CH$_2$=CH'—CH$_2$—(A)$_n$—OH in which A is an oxyalkylene group, R' is selected from the group consisting of hydrogen and C$_1$-C$_5$ alkyl, and n, which is the average number of oxyalkylene groups in the alkoxylated allylic alcohol, has a value from 1 to 50. Preferred oxyalkylene groups are oxyethylene, oxypropylene, oxybutylenes, and mixtures thereof. Most preferred are propoxylated allylic alcohols having an average of 1 to 10 oxypropylene groups.

Suitable alkoxylated allylic alcohols can be prepared by reacting an allylic alcohol with up to about 50 equivalents of one or more alkylene oxides in the presence of a basic catalyst as described, for example, in U.S. Pat. Nos. 3,268,561 and 4,618,703, the teachings of which are incorporated herein by reference. As will be apparent to those skilled in the art, suitable alkoxylated allylic alcohols can also be made by acid catalysis, as described, for example, in *J. Am. Chem. Soc.*, 71, (1949) 1152.

The relative amounts of N-alkenyl amide and allylic monomer used to make copolymer resin intercalants of the invention depends on many factors, including the desired degree of hydrophilicity, the desired hydroxyl content, the nature of the monomers used, suitability for the particular end-use application, and other factors. Preferably, the copolymer resin comprises from about 5 to about 95 weight percent of N-alkenyl amide recurring units, and from about 5 to about 95 weight percent of allylic monomer recurring units. More preferably, the resin comprises from about 25 to about 75 weight percent of N-alkenyl amide recurring units, and from about 25 to about 75 weight percent of allylic monomer recurring units. Most preferred resins comprise from about 30 to about 60 weight percent of N-alkenyl amide recurring units, and from about 40 to about 70 weight percent of allylic monomer recurring units.

Optionally, the copolymer resin intercalants incorporate recurring units derived from one or more ethylenic monomers. The ethylenic monomer is often included to control resin solubility, enhanced physical properties, or reduce cost. Preferably, the ethylenic monomer is used in an amount within the range of about 0.1 to about 50 weight percent, based on the total weight of monomers copolymerized to form the copolymer. A more preferred range is from about 1 to about 25 weight percent. Preferred ethylenic monomers include, for example, vinyl aromatic monomers, acrylates and methacrylates, unsaturated nitriles, vinyl esters, vinyl ethers, vinyl halides, vinylidene halides, unsaturated anhydrides, unsaturated dicarboxylic acids, acrylic and methacrylic acids, acrylamide and methacrylamide, fluoroalkyl acrylates and methacrylates, conjugated dienes, and the like, and mixtures thereof.

The copolymer resin intercalants of the invention preferably have number average molecular weights within the range of about 500 to about 100,000. A more preferred range is from about 2,500 to about 50,000.

The copolymer resin intercalants have hydroxyl numbers within the range of 0 to about 400 mg KOH/g. (In other words, the resins need not have any hydroxyl group content, but may incorporate a substantial proportion of hydroxyl groups.). A more preferred range for the hydroxyl number is from about 25 to about 250 mg KOH/g; most preferred is the range from about 50 to about 200 mg KOH/g. The need for hydroxyl groups depends on the intended end-use application. In coatings, for example, it is often important for the resin to have a significant hydroxyl group content; in contrast, many composites can benefit from copolymer resin intercalants of the invention that contain no hydroxyl groups.

The average hydroxyl functionality of the copolymer resin intercalants generally ranges from 0 to about 20.

Preferably, the hydroxyl functionality is within the range of about 2 to about 20; most preferred is the range from about 3 to about 10. As noted above, the need for hydroxyl functionality depends on the desired end use.

In coating applications, glass-transition temperature of the copolymer resin can be important. Copolymer resins of the invention preferably have a glass-transition temperature (Tg) within the range of about −50° C. to about 100° C. A more preferred range is from about −40° C. to about 40° C.

The monomers are copolymerized preferably in the presence of a free-radical initiator. The free-radical initiator is preferably a peroxide, hydroperoxide, or azo compound. Preferred initiators have a decomposition temperature greater than about 100° C. Examples include tert-butyl hydroperoxide, di-tert-butyl peroxide, tert-butyl perbenzoate, cumene hydroperoxide, and the like.

The amount of free-radical initiator needed varies, but is generally within the range of about 0.1 to about 10 weight percent based on the amount of monomers. Preferably, the amount of free-radical initiator used is within the range of about 1 to about 5 weight percent; most preferred is the range from about 2 to about 4 weight percent.

Generally, it is preferred to add the free-radical initiator to the reactor gradually during the course of the polymerization. When preparing coating resins, it is also desirable to add the N-alkenyl amide gradually to the reactor, and to match the addition rate of the free-radical initiator to the polymerization rate of the N-alkenyl amide. When an ethylenic monomer is included, it is preferred to add it in proportion to the N-alkenyl amide. For example, if half of the N-alkenyl amide is added gradually, then it is preferred to charge half of the ethylenic monomer initially and add the remaining portion with the N-alkenyl amide. As with the N-alkenyl amide, all of the ethylenic monomer can be added gradually. These techniques produce a polymer that has an evenly distributed hydroxyl functionality that is relatively independent of molecular weight.

A batch process in which all of the monomers are charged initially to the reactor is suitable when the goal is to make copolymer resins for applications in which the distribution of hydroxyl functionality in the resin is less important. In the preferred batch process, the N-alkenyl amide and allylic monomer are charged initially and the free-radical initiator is added gradually as the reaction proceeds.

The process for manufacturing the copolymer intercalants can be performed over a wide temperature range. Generally, the reaction temperature will be within the range of about 60° C. to about 300° C. A more preferred range is from about 90° C. to about 200° C.; most preferred is the range from about 100° C. to about 180° C.

The process for manufacturing the copolymer intercalants is advantageously performed in the absence of any reaction solvent, but a solvent may be included if desired. Useful solvents include those that will not interfere with the free-radical polymerization reaction or otherwise react with the monomers. Suitable solvents include, for example, ethers, esters, ketones, aromatic and aliphatic hydrocarbons, alcohols, glycol ethers, glycol ether esters, and the like, and mixtures thereof.

One advantage of the process of manufacturing the copolymer intercalants is that no solvent is needed to polymerize the reactive monomers at a low rate of polymerization. This obviates the need to remove a solvent later from the resin and saves on the expense of using and recovering a solvent. The process also gives low molecular weight polymer intercalants useful as polymer intercalant intermediates without the need to include a chain-transfer agent. Chain-transfer agents often impart undesirable odors and detract from a polymer's ultimate physical properties.

The invention includes the intercalants and exfoliates made using the copolymer resins for use as fillers in thermoplastic and thermosetting polymers, including thermoset coatings, sealants, elastomers, adhesives, and foams made using the hydroxy-functional copolymer resin intercalants. The thermosets include, for example, melamines, polyurethanes, epoxy thermosets, polyesters, alkyds, and uralkyds. For example, melamine-based intercalants can be prepared by reacting the above-described copolymer resin intercalants with melamine resins. Suitable melamine resins include commercial grade hexamethoxymethylmelamines, such as, for example, CYMEL 303 cross-linking agent, a product of Cytec.

A polyurethane nanocomposite intercalant is made by reacting a hydroxy-functional copolymer intercalant with a di- or polyisocyanate or an isocyanate-terminated prepolymer, either in-situ (while intercalated) or prior to intercalation. Prepolymer intercalants derived from the copolymer resin intercalants also can be used to intercalate the layered materials. Optionally, a low molecular weight chain extender (diol, diamine, or the like) can be included with the monomers used to form the copolymer intercalants. Suitable di- or polyisocyanates are those well known in the polyurethane industry, and include, for example, toluene diisocyanate, MDI, polymeric MDIs, carbodiimide-modified MDIs, hydrogenated MDIs, isophorone diisocyanate, 1,6-hexanediisocyanate, and the like. Isocyanate-terminated prepolymer intercalants are made in the usual way from a polyisocyanate and a polyether polyol, polyester polyol, or the like. The polyurethane is formulated at any desired NCO index, but it is preferred to use an NCO index close to 1. If desired, all of the available NCO groups are treated with hydroxy groups from the copolymer resin and any chain extenders.

The invention includes intercalate-filled and/or exfoliate-filled epoxy thermosets, and the intercalates and exfoliates that are intercalated with copolymer intercalants which are the reaction products of hydroxy-functional copolymer resins described above and an epoxy resin. Suitable epoxy resins generally have two or more epoxy groups available for reaction with the hydroxyl groups of the copolymer resin. Particularly preferred epoxy resins are bisphenol-A diglycidyl ether and the like. Other suitable methods of making epoxy thermoset intercalants are described in U.S. Pat. No. 4,609,717, the teachings of which are incorporated herein by reference.

The intercalants also include thermoset polyesters that are the reaction products of the above-described hydroxy-functional copolymer resins and an anhydride or a di- or polycarboxylic acid. Suitable anhydrides and carboxylic acids are those commonly used in the polyester industry. Examples include phthalic anhydride, phthalic acid, maleic anhydride, maleic acid, adipic acid, isophthalic acid, terephthalic acids, sebacic acid, succinic acid, trimellitic anhydride, and the like, and mixtures thereof. Other suitable methods for making thermoset polyester intercalants are described in U.S. Pat. No. 3,457,324, hereby incorporated by reference.

The invention includes alkyd intercalants prepared by reacting the above-described hydroxy-functional copolymer intercalants with an unsaturated fatty acid. Suitable unsaturated fatty acids are those known in the art as useful for alkyd resins, and include, for example, oleic acid, ricinoleic acid, linoleic acid, licanic acid, and the like, and mixtures thereof. Mixtures of unsaturated fatty acids and saturated fatty acids such as lauric acid or palmitic acid can also be used. The alkyd resins are particularly useful for making alkyd coatings. For example, a hydroxy-functional copolymer resin, or a mixture of the resin and glycerin or another low molecular weight polyol, is first partially esterified with an unsaturated fatty acid to give a alkyd resin. The resin is then combined with an organic solvent, and the resin solution is stored until needed. A drying agent such as cobalt acetate is added to the solution of alkyd resin, the solution is spread onto a surface, the solvent evaporates, and the resin cures leaving an alkyd intercalant. Other suitable methods for making alkyd resin intercalants are described in U.S. Pat. No. 3,423,341, hereby incorporated by reference.

Instead of combining the alkyd resin with an organic solvent for intercalation of the layered material, the resin intercalants can be dispersed in water to make a water-based alkyd intercalating composition. To improve the water dispersability of the alkyd resin intercalants, a free hydroxyl group in the alkyd resin can be converted to a salt. For example, the alkyd resin can be reacted with phthalic anhydride to give a resin intercalant that contains phthalic acid residues; addition of sodium hydroxide makes the sodium phthalate salt, and provides a water-dispersable alkyd resin intercalant derived from the allyl ester copolymer. See, for example, U.S. Pat. No. 3,483,152.

The invention includes polyurethane-modified alkyd (uralkyd) intercalants prepared from the hydroxy-functional copolymer resin intercalants of the invention. These uralkyd resin intercalants, and exfoliates thereof, are especially valuable as fillers in uralkyd coatings. The hydroxy-functional copolymer resin is first partially esterified with an unsaturated fatty acid (described above) to give an alkyd resin. The alkyd resin, which contains some free hydroxyl groups, is reacted with a di- or polyisocyanate (described above) to give a prepolymer. The prepolymer is then reacted with a chain extender, atmospheric moisture, or additional alkyd resin to give a uralkyd intercalant. Other suitable methods for making uralkyd resin intercalants are described in U.S. Pat. No. 3,267,058, hereby incorporated by reference.

In composites, the resins offer good performance in a less-expensive alternative to commercially available intercalants such as poly(N-vinylpyrrolidone). Incorporation of allylic monomers allows formulations to control performance of the intercalant polymer, including bonding efficiency, while minimizing cost.

The following examples merely illustrate the invention. Those skilled in the art will recognize many variations that are within the spirit of the invention and scope of the claims.

EXAMPLE 1

Copolymer Resin Intercalants From N-Vinylpyrrolidone And Propoxylated Allyl Alcohol Allyl alcohol propoxylate (average of 1.6 oxypropylene units, 350 g) is charged to a one-liter reaction kettle equipped with agitator, heating mantel, temperature controller, nitrogen purge device, condenser, and addition pump. N-vinylpyrrolidone (350 g) and t-butyl perbenzoate (10 g) are mixed at 50° C. in a chiller, deoxygenated with nitrogen, and charged to the addition pump. After purging the reactor three times with nitrogen, the reactor contents are heated to 145° C. The N-vinylpyrrolidone/initiator mixture is gradually added at an even rate to the reactor over 4 hours at 145° C. The mixture is heated for another 45 minutes following completion of the monomer addition. Unreacted monomers are removed by vacuum stripping of the mixture at 160° C. The copolymer resin product has $M_w$=12,600; $M_n$32 3260; and $T_9$=21° C.

EXAMPLE 2

Copolymer Resin Intercalants From N-Vinylpyrrolidone And Propoxylated Allyl Alcohol The procedure of Example 1 is followed, but allyl alcohol propoxylate having an average of ten oxypropylene units (350 g) is used. The polymer has $T_g$=−28° C.

EXAMPLE 3

Copolymer Resin Intercalants From N-Vinylpyrrolidone And Propoxylated Allyl Alcohol The procedure of Example 1 is followed using 525 g of allyl alcohol propoxylate (ave. of 1.6 oxypropylene units) and 175 g of N-vinylpyrrolidone. The copolymer resin has $M_w$=8660; Mn–1570; and hydroxyl number 172 mg KOH/g.

EXAMPLE 4

Copolymer Resin Intercalants From N-Vinylpyrrolidone And Allyl Alcohol

Allyl alcohol (750 g) and N-vinylpyrrolidone (750 g) are charged to a five-liter reaction kettle equipped with agitator, heating mantle, temperature controller, inlets for nitrogen and vacuum, condenser, and addition pump. Di-tert-butyl peroxide (25 g) is charged to the reactor. Additional di-tert-butyl peroxide (50 g) is added to the addition pump. After purging the reactor three times with nitrogen, the reactor contents are heated to 135° C. The initiator is gradually added at a decreasing rate to the reactor over 4 hours at 135° C. The initiator addition is performed as follows: first hour, 20 g; second hour, 15 g; third hour, 10 g; fourth hour. 5 g. The mixture is heated for another 60 minutes following completion of the monomer addition. Unreacted monomers are removed by vacuum stripping of the mixture at 160° C.

The amount of intercalated and/or exfoliated layered material included in a liquid carrier or into a matrix polymer to form viscous carriers or a composite polymeric material may vary widely depending on the intended use of the material. When the intercalate or exfoliate is added to a solvent to form the viscous compositions suitable to deliver the carrier or some carrier-dissolved or carrier-dispersed active material, such as a pharmaceutical, relatively higher amounts of intercalates, i.e., from about 10% to about 30% by weight of the total composition, are used in forming solvent gels having extremely high viscosities, e.g., 5,000 to 5,000,000 centipoises. Extremely high viscosities, however, also can be achieved with a relatively small concentration of intercalates and/or exfoliates thereof, e.g., 0.1% to 5% by weight, by adjusting the pH of the composition in the range of about 0–6 or about 10–14 and/or by heating the composition above room temperature, e.g., in the range of about 250° C. to about 1200° C., preferably about 75° C. to about 100° C.

Relatively larger amounts of platelet particles (exclusive of the intercalant polymer, since the intercalant polymer content in the layered material may vary), i.e., from about 15% to about 30% by weight of the mixture, are used in applications when the intercalate and/or exfoliate is added to a matrix polymer and the composite material is used to form stamped polymeric articles. Substantially enhanced barrier properties and heat resistance (deflection temperature under load, DTUL) are imparted by platelet particle concentrations greater than about 2.5% in a matrix polymer. Similarly, substantially enhanced strength is imparted by platelet particle concentrations greater than about 1.5%, including the nano-scale layered materials of this invention. It is preferred that the platelet loading be less than about 10%. Platelet particle loadings within the range of about 0.05% to about 40% by weight, preferably about 0.50 to about 20%, more preferably about 1% to about 10% of the composite material significantly enhances modulus, dimensional stability, and wet strength. In general, the amount of platelet particles incorporated into a matrix polymer is less than about 90% by weight of the mixture, and preferably from about 0.01% to about 80% by weight of the composite material mixture, more preferably from about 0.05% to about 40% by weight of the polymer/particle mixture, and most preferably from about 0.05% to about 200 or 0.05% to about 100 by weight, with some matrix polymers.

In accordance with an important feature of the present invention, the intercalated phyllosilicate can be manufactured in a concentrated form, e.g., 10–90%, preferably 20–80% intercalant polymer and 10–90%, preferably 20–80% intercalated phyllosilicate that can be dispersed in a solvent or matrix polymer and exfoliated before or after addition to the solvent or to a polymer melt to a desired platelet loading. The intercalates are exfoliated and dispersed into a host material, such as an organic solvent or one or more melt-processible thermoplastic and/or thermosetting matrix oligomers or polymers, or mixtures thereof.

In accordance with an important feature of the present invention, a wide variety of topically-active compounds can be incorporated into a stable composition of the present invention. Such topically active compositions include cosmetic, industrial, and medicinal compounds that act upon contact with the skin or hair, or are used to adjust rheology of industrial greases and the like. In accordance with another important feature of the present invention, a topically-active compound can be solubilized in the composition of the present invention or can be homogeneously dispersed throughout the composition as an insoluble, particulate material. In either case topically-effective compositions of the present invention are resistant to composition separation and effectively apply the topically-active compound to the skin or hair. If required for stability, a surfactant can be included in the composition, such as any disclosed in Laughlin, et al. U.S. Pat. No. 3,929,678, hereby incorporated by reference. In general, the topically-effective compositions of the present invention demonstrate essentially no phase separation if the topically-active compound is solubilized in the compositions. Furthermore, if the topically-active compound is insoluble in the composition, the composition demonstrates essentially no phase separation.

The topically-active compounds can be a cosmetically-active compound, a medically-active compound or any other compound that is useful upon application to the skin or hair. Such topically-active compounds include, for example, antiperspirants, antidandruff agents, antibacterial compounds, antifungal compounds, anti-inflammatory compounds, topical anesthetics, sunscreens and other cosmetic and medical topically-effective compounds.

Therefore, in accordance with an important feature of the present invention, the stable topically-effective composition can include any of the generally-known antiperspirant compounds such as finely-divided solid astringent salts, for example, aluminum chlorohydrate, aluminum chlorohydrox, zirconium chlorohydrate, and complexes of aluminum chlorohydrate with zirconyl chloride or zirconyl hydroxychloride. In general, the amount of the antiperspirant compound, such as aluminum zirconium tetrachlorohydrex glycine in the composition can range from about 0.01 to about 50%, and preferably from about 0.1% to about 30%, by weight of the total composition.

Other topically-active compounds can be included in the compositions of the present invention in an amount sufficient to perform their intended function. For example, zinc oxide, titanium dioxide or similar compounds can be included if the composition is intended to be a sunscreen. Similarly, topically-active drugs, like antifungal compounds; antibacterial compounds; anti-inflammatory compounds; topical anesthetics; skin rash, skin disease and dermatitis medications; and anti-itch and irritation-reducing compounds can be included in the compositions of the present invention. For example, analgesics such as benzocaine, dyclonine hydrochloride, aloe vera and the like; anesthetics such as butamben picrate, lidocaine hydrochloride, zylocaine and the like; antibacterials and antiseptics, such as povidoneiodine, polymyxin b sulfate-bacitracin, zincneomycin sulfate-hydrocortisone, chloramphenicol, methylbenzethonium chloride, and erythromycin and the like; antiparasitics, such as lindane; deodorants, such as chlorophyllin copper complex, aluminum chloride, aluminum chloride hexahydrate, and methylbenzethonium chloride; essentially all dermatologicals, like acne preparations, such as benzoyl peroxide, erythromycin-benzoyl peroxide, clindamycin phosphate, 5,7-dichloro-8-hydroxyquinoline, and the like; anti-inflammatory agents, such as alclometasone dipropionate, betamethasone valerate, and the like; burn relief ointments, such as o-amino-p-toluenesulfonamide monoacetate and the like; depigmenting agents, such as monobenzone; dermatitis relief agents, such as the active steroids amcinonide, diflorasone diacetate, hydrocortisone, and the like; diaper rash relief agents, such as methylbenzethonium chloride and the like; emollients and moisturizers, such as mineral oil, PEG-4 dilaurate, lanolin oil, petrolatum, mineral wax and the like; fungicides, such as butocouazole nitrate, haloprogin, clotrimazole, and the like; herpes treatment drugs, such as 9-[(2-hydroxyethoxy)methyl]guanine; pyritic medications, such as alclometasone dipropionate, betamethasone valerate, isopropyl myristate MSD, and the like; psoriasis, seborrhea and scabicide agents, such as anthralin, methoxsalen, coal tar and the like; sunscreens, such as octyl p-(dimethylamino)benzoate, octyl methoxycinnamate, oxybenzone and the like; steroids, such as 2-(acetyloxy)-9-fluoro-1',2',3',4'-tetrahydro-11hydroxypregna-1,4-dieno[16,17-b]naphthalene-3,20dione, and 21-chloro-9-fluoro-1',2',3',4'-tetrahydro-11b-hydroxypregna-1,4-dieno[16z,17-b]naphthalene-3,20-dione. Any other medication capable of topical administration also can be incorporated in composition of the present invention in an amount sufficient to perform its intended function.

Matrix polymers for use in the process of this invention may vary widely, the only requirement is that they are melt processible. The resin intercalants described herein are, of course, completely compatible with matrix polymers that are the same as the resin intercalants. Additionally, the matrix polymers can be altered in monomer percentages, or may contain an ethylenic monomer, where the copolymer intercalants contain only the N-alkenyl amide and/or acrylate-functionalized pyrrolidone and an allylic monomer. In the preferred embodiments of the invention, the matrix polymer includes at least 10, preferably at least 30 recurring monomeric units. The upper limit to the number of recurring monomeric units is not critical, provided that the melt index of the matrix polymer under use conditions is such that the matrix polymer forms a flowable mixture. Most preferably, the matrix polymer includes from at least about 10 to about 100 recurring monomeric units. In the most preferred embodiments of this invention, the number of recurring units is such that the matrix polymer has a melt index of from about 0.01 to about 12 grams per 10 minutes at the processing temperature.

Thermoplastic resins and rubbers for use as matrix polymers in the practice of this invention may vary widely. Illustrative of useful thermoplastic resins, which may be used alone or in admixture, are polylactones such as poly (pivalolactone), poly(caprolactone) and the like; polyurethanes derived from reaction of diisocyanates such as 1,5-naphthalene diisocyanate; p-phenylene diisocyanate, m-phenylene diisocyanate, 2,4-toluene diisocyanate, 4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane and the like and linear long-chain hydroxy terminated polyesters; polyethers based on diols, such as poly(tetramethylene adipate), poly(ethylene adipate), poly(1,4-butylene adipate), poly(ethylene succinate), poly(2,3-butylene succinate), polyether diols and the like; polycarbonates such as poly[methane bis(4-phenyl) carbonate], poly[1,1-ether bis(4-phenyl) carbonate], poly [diphenylmethane bis(4-phenyl)carbonate], poly[1,1-cyclohexane bis(4-phenyl)carbonate] and the like; polysulfones; polyethers; polyketones; polyamides such as poly(4-amino butyric acid), poly(hexamethylene adipamide), poly (6-aminohexanoic acid), poly(m-xylylene adipamide), poly (p-xylylene sebacamide), poly(2,2,2-trimethyl hexamethylene terephthalamide), poly(metaphenylene isophthalamide) (NOMEX), poly(p-phenylene terephthalamide) (KEVLAR), and the like; polyesters such as poly(ethylene azelate), poly(ethylene-1,5-naphthalate, poly(1,4-cyclohexane dimethylene terephthalate), poly (ethylene oxybenzoate) (A-TELL), poly(parahydroxy benzoate) (EKONOL), poly(1,4-cyclohexylidene dimethylene terephthalate) (KODEL) (cis), poly(1,4-cyclohexylidene dimethylene terephthalate) (KODEL) (trans), polyethylene terephthalate, polybutylene terephthalate and the like; poly(arylene oxides) such as poly(2,6-dimethyl-1,4-phenylene oxide), poly(2,6-diphenyl-1,4-phenylene oxide) and the like; poly(arylene sulfides) such as poly(phenylene sulfide) and the like; polyetherimides; vinyl polymers and their copolymers such as polyvinyl acetate, polyvinyl alcohol, polyvinyl chloride; polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, polyacrylic acid, ethyleneacrylic acid copolymers, ethylene-vinyl alcohol copolymers acrylonitrile copolymers, methyl methacrylate-styrene copolymers, ethylene-ethyl acrylate copolymers, methacrylated butadiene-styrene copolymers and the like; polyolefins such as low density poly(ethylene), poly(propylene), chlorinated low density poly(ethylene), poly(4-methyl-1-pentene), poly(ethylene), poly(styrene), and the like; ionomers; poly(epichlorohydrins); poly(urethane) such as the polymerization product of diols, such as ethylene glycol, propylene glycol, and/or a polydiol, such as diethylene glycol, triethylene glycol and/or tetraethylene glycol, and the like, with a polyisocyanate such as 2,4-tolylene diisocyanate, 2,6-tolylene diisocyante, 4,4'-diphenylmethane diisocyanate, 1,6-hexamethylene diisocyanate, 4,4'-dicyclohexylmethane diisocyanate and the like; and polysulfones such as the reaction product of the sodium salt of 2,2-bis(4-hydroxyphenyl) propane and 4,4'-dichlorodiphenyl sulfone; furan resins such as poly(furan); cellulose ester plastics such as cellulose acetate, cellulose acetate butyrate, cellulose propionate and the like; silicones such as poly(dimethyl siloxane), poly(dimethyl siloxane co-phenylmethyl siloxane), and the like; protein plastics; and blends of two or more of the foregoing.

Vulcanizable and thermoplastic rubbers useful in the practice of this invention may also vary widely. Illustrative of such rubbers are brominated butyl rubber, chlorinate butyl rubber, polyurethane elastomers, fluoroelastomers, polyester elastomers, polyvinylchloride, butadiene/acrylonitrile elastomers, silicone elastomers, poly(butadiene), poly (isobutylene), ethylene-propylene copolymers, ethylene-propylenediene terpolymers, sulfonated ethylene-propylenediene terpolymers, poly(chloroprene), poly(2,3-dimethylbutadiene), poly(butadiene-pentadiene), chlorosulphonated poly(ethylenes), poly(sulfide) elastomers, block copolymers, made up of segments of glassy or crystalline blocks such as poly(styrene), poly (vinyl-toluene), poly(t-butyl styrene), polyesters and the like and the elastomeric blocks such as poly(butadiene), poly (isoprene), ethylene-propylene copolymers, ethylene-butylene copolymers, polyether and the like as for example the copolymers in poly(styrene)-poly(butadiene)-poly (styrene) block copolymer manufactured by Shell Chemical Company under the trade name KRATONO.

Useful thermosetting resins include, for example, the polyamides; polyalkylamides; polyesters; polyurethanes; polycarbonates; polyepoxides; and mixtures thereof. Thermoset resins based on water-soluble prepolymers, include prepolymers based on formaldehyde: phenols (phenol, cresol and the like); urea; melamine; melamine and phenol; urea and phenol. Polyurethanes based on: toluene diisocyanate (TDI) and monomeric and polymeric diphenyl methanediisocyanates (MDI); hydroxy terminated polyethers (polyethylene glycol, polypropylene glycol, copolymers of ethylene oxide and propylene oxide and the like); amino terminated polyethers, polyamines (tetramethylene diamine, ethylenediamine, hexamethylenediamine, 2,2-dimethyl 1,3-propanediamine; melamine, diaminobenzene, triaminobenzene and the like); polyamidoamines (for instance, hydroxy terminated polyesters); unsaturated polyesters based on maleic and fumaric anhydrides and acids; glycols (ethylene, propylene), polyethylene glycols, polypropylene glycols, aromatic glycols and polyglycols; unsaturated polyesters based on vinyl, allyl and acryl monomers; epoxides, based on biphenol A (2,2'-bis(4-hydroxyphenyl) propane) and epichlorohydrin; epoxy prepolymers based on monoepoxy and polyepoxy compounds and α,β unsaturated compounds (styrene, vinyl, allyl, acrylic monomers); polyamides 4-tetramethylene diamine, hexamethylene diamine, melamine, 1,3-propanediamine, diaminobenzene, triaminobenzene, 3,3'4,4'-bitriaminobenzene; 3,3', 4,4'-biphenyltetramine and the like). Polyethyleneimines; amides and polyamides (amides of di-, tri-, and tetra acids); hydroxyphenols (pyrogallol, gallic acid, tetrahydroxybenzophenone, tetrahydroquinone, catechol, phenol and the like); anhydrides and polyanhydrides of di-, tri-, and tetra acids; polyisocyanurates based on TDI and MDI; polyimides based on pyromellitic dianhydride and 1,4-phenyldiamine; polybenzimidozoles based on 3,3'4,4'-biphenyltetramine and isophthalic acid; polyamide based on unsaturated dibasic acids and anhydrides (maleic, fumaric) and aromatic polyamides; alkyd resins based on dibasic aromatic acids or anhydrides, glycerol, trimethylolpropane, pentaerythritol, sorbitol and unsaturated fatty long chain carboxylic acids (the latter derived from vegetable oils); and prepolymers based on acrylic monomers (hydroxy or carboxy functional).

Most preferred thermoplastic polymers are thermoplastic polymers such as polyamides, polyesters, and polymers of alpha-beta unsaturated monomers and copolymers. Polyamides which may be used in the process of the present invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formula:

$$-NHCOR^{13}COHNR^-$$

which $R^{13}$ is an alkylene group of at least 2 carbon atoms, preferably from about 2 to about 11, or arylene having at least about 6 carbon atoms, preferably about 6 to about 17 carbon atoms; and $R^{14}$ is selected from $R^{13}$ and aryl groups. Also, included are copolyamides and terpolyamides obtained by known methods, for example, by condensation of hexamethylene diamine and a mixture of dibasic acids consisting of terephthalic acid and adipic acid. Polyamides of the above description are well-known in the art and include, for example, the copolyamide of 300 hexamethylene diammonium isophthalate and 700 hexamethylene diammonium adipate, poly(hexamethylene adipamide) (nylon 6,6), poly(hexamethylene sebacamide) (nylon 6, 10), poly(hexamethylene isophthalamide), poly(hexamethylene terephthalamide), poly(heptamethylene pimelamide) (nylon 7,7), poly(octamethylene sebacamide) (nylon 8,8), poly(nonamethylene azelamide) (nylon 9,9) poly(decamethylene azelamide) (nylon 10,9), poly(decamethylene sebacamide) (nylon 10,10), poly[bis(4-amino cyclohexyl)methane-1,10-decanecarboxamide)], poly(m-xylylene adipamide), poly(p-xylylene sebacamide), poly(2,2,2-trimethyl hexamethylene terephthalamide), poly(piperazine sebacamide), poly(p-phenylene terephthalamide), poly(metaphenylene isophthalamide) and the like.

Other useful polyamides are those formed by polymerization of amino acids and derivatives thereof, as, for example, lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like.

Preferred polyamides are poly(caprolactam), poly(12-aminododecanoic acid) and poly(hexamethylene adipamide).

Other matrix or host polymers which may be employed in admixture with exfoliates to form nanocomposites are linear polyesters. The type of polyester is not critical and the particular polyesters chosen for use in any particular situation will depend essentially on the physical properties and features, i.e., tensile strength, modulus and the like, desired in the final form. Thus, a multiplicity of linear thermoplastic polyesters having wide variations in physical properties are suitable for use in admixture with exfoliated layered material platelets in manufacturing nanocomposites in accordance with this invention.

The particular polyester chosen for use can be a homopolyester or a co-polyester, or mixtures thereof, as desired. Polyesters are normally prepared by the condensation of an organic dicarboxylic acid and an organic diol, and, the reactants can be added to the intercalates, or exfoliated intercalates for in situ polymerization of the polyester while in contact with the layered material, before or after exfoliation of the intercalates.

Polyesters which are suitable for use in this invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters.

Exemplary of useful cycloaliphatic, aliphatic and aromatic polyesters which can be utilized in the practice of their invention are poly(ethylene terephthalate), poly(cyclohexylenedimethylene terephthalate), poly(ethylene dodecate), poly(butylene terephthalate), poly[ethylene(2,7-naphthalate)], poly(methaphenylene isophthalate), poly(glycolic acid), poly(ethylene succinate), poly(ethylene adipate), poly(decamethylene azelate), poly(ethylene sebacate), poly(decamethylene adipate), poly(decamethylene sebacate), poly(dimethylpropiolactone), poly(parahydroxybenzoate) (EKONOL), poly(ethylene oxybenzoate) (A-tell), poly(ethylene isophthalate), poly(tetramethylene terephthalate, poly(hexamethylene terephthalate), poly(decamethylene terephthalate), poly(1,4-cyclohexane dimethylene terephthalate) (trans), poly(ethylene 1,5-naphthalate), poly(ethylene 2,6-naphthalate), poly(1,4-cyclohexylidene dimethylene terephthalate), (KODEL) (cis), and poly(1,4-cyclohexylidene dimethylene terephthalate (KODEL) (trans).

Polyester compounds prepared from the condensation of a diol and an aromatic dicarboxylic acid are especially suitable in accordance with the present invention. Illustrative of such useful aromatic carboxylic acids are terephthalic acid, isophthalic acid and o-phthalic acid, 1,3-naphthalenedicarboxylic acid, 1,4-naphthalenedicarboxylic acid, 2,6-naphthalenedicarboxylic acid, 2,7-naphthalenedicarboxylic acid, 4,4'-diphenyldicarboxylic acid, 4,4'-diphenylsulfone-dicarboxylic acid, 1,1,3-trimethyl-5-carboxy-3-(p-carboxyphenyl)-idane, diphenyl ether 4,4'-dicarboxylic acid, bis-p(carboxy-phenyl) methane and the like. Of the aforementioned aromatic dicarboxylic acids, those based on a benzene ring (such as terephthalic acid, isophthalic acid, orthophthalic acid) are preferred for use in the practice of this invention. Amongst these preferred acid precursors, terephthalic acid is particularly preferred acid precursor.

The most preferred embodiments of this invention incorporate the intercalate into a polymer selected from the group consisting of poly(ethylene terephthalate), poly(butylene terephthalate), poly(1,4-cyclohexane dimethylene terephthalate), a polyvinylimine, and mixture thereof. Among these polyesters of choice, poly(ethylene terephthalate) and poly(butylene terephthalate) are most preferred.

Still other useful thermoplastic homopolymers and copolymer matrix polymers for forming nanocomposites are polymers formed by polymerization of alpha-beta-unsaturated monomers or the formula:

$$R^{15}R^{16}C=CH_2$$

wherein:

$R^{15}$ and $R^{16}$ are the same or different and are cyano, phenyl, carboxy, alkylester, halo, alkyl, alkyl substituted with one or more chloro or fluoro, or hydrogen. Illustrative of such preferred homopolymers and copolymers are homopolymers and copolymers of ethylene, propylene, vinyl alcohol, acrylonitrile, vinylidene chloride, esters of acrylic acid, esters of methacrylic acid, chlorotrifluoroethylene, vinyl chloride and the like. Preferred are poly(propylene), propylene copolymers, poly (ethylene) and ethylene copolymers. More preferred are poly(ethylene) and poly(propylene).

In the preferred embodiments of the invention, the matrix polymers of choice in manufacturing nanocomposites are polymers and copolymers of olefins, polyesters, polyamides, polyvinylimines, and blends thereof containing polyesters. In the particularly preferred embodiments of the invention, polymers and copolymers of ethylene, polyamides (preferably nylon 6 and nylon 66 and more preferably nylon 6), and blends thereof are used.

The mixture may include various optional components which are additives commonly employed with polymers. Such optional components include nucleating agents, fillers, plasticizers, impact modifiers, chain extenders, plasticizers, colorants, mold release lubricants, antistatic agents, pigments, fire retardants, and the like. These optional components and appropriate amounts are well known to those skilled in the art.

Exfoliation of the intercalated layered material should provide delamination of at least about 90% by weight of the intercalated material to provide a composition comprising a polymeric matrix having platelet particles substantially homogeneously dispersed therein. Some intercalates require a shear rate that is greater than about 10 sec.$^{-1}$ for such relatively thorough exfoliation. Other intercalates exfoliate naturally or by heating to the melt temperature of the intercalant polymer, or by applying pressure, e.g., 0.5 to 60 atmospheres above ambient, with or without heating. The upper limit for the shear rate is not critical provided that the shear rate is not so high as to physically degrade the polymer. In the particularly preferred embodiments of the invention, when shear is employed for exfoliation, the shear rate is from greater than about 10 sec$^{-1}$ to about 20,000 sec$^{-1}$, and in the more preferred embodiments of the invention the shear rate is from about 100 sec$^{-1}$ to about 10,000 sec$^{-1}$.

When shear is employed for exfoliation, any method which can be used to apply a shear to a flowable mixture or any polymer melt can be used. The shearing action can be provided by any appropriate method, as for example by mechanical means, by thermal shock, by pressure alteration, or by ultrasonics, all known in the art. In particularly useful procedures, the flowable polymer mixture is sheared by mechanical methods in which portions of the melt are caused to flow past other portions of the mixture by use of mechanical means, such as stirrers, Banbury® type mixers, Brabender® type mixers, long continuous mixers, and extruders. Another procedure employs thermal shock in which shearing is achieved by alternatively raising or lowering the temperature of the mixture causing thermal expansions and resulting in internal stresses which cause the shear. In still other procedures, shear is achieved by sudden pressure changes in pressure alteration methods; by ultrasonic techniques in which cavitation or resonant vibrations which cause portions of the mixture to vibrate or to be excited at different phases and thus subjected to shear. These methods of shearing flowable polymer mixtures and polymer melts are merely representative of useful methods, and any method known in the art for shearing flowable polymer mixtures and polymer melts may be used.

Mechanical shearing methods may be employed such as by extrusion, injection molding machines, Banbury® type mixers, Brabender® type mixers and the like. Shearing also can be achieved by introducing the polymer melt at one end of the extruder (single or double screw) and receiving the sheared polymer at the other end of the extruder. The temperature of the polymer melt, the length of the extruder, residence time of the melt in the extruder and the design of the extruder (single screw, twin screw, number of flights per unit length, channel depth, flight clearance, mixing zone, etc.) are several variables which control the amount of shear to be applied.

Exfoliation should be sufficiently thorough to provide at least about 80% by weight, preferably at least about 85% by weight, more preferably at least about 90% by weight, and most preferably at least about 95% by weight delamination of the layers to form platelet particles substantially homogeneously dispersed in the polymer matrix. As formed by this process, the platelet particles dispersed in matrix polymers have the thickness of the individual layers, or small multiples less than about 10, preferably less than about 5 and more preferably less than about 3 of the layers, and still more preferably 1 or 2 layers. In the preferred embodiments of this invention, intercalation and delamination of every interlayer space is complete so that all or substantially all individual layers delaminate one from the other to form separate platelet particles. In cases where intercalation is incomplete between some layers, those layers will not delaminate in a polymer melt, and will form platelet particles comprising those layers in a coplanar aggregate.

The effect of adding into a matrix polymer the nanoscale particulate dispersed platelet particles, derived from the intercalates formed in accordance with the present invention, typically is an increase in tensile modulus and ultimate tensile strength or an increase in ultimate impact resistance or glass transition temperature (Tg).

Molding compositions comprising a thermoplastic or thermosetting polymer containing a desired loading of platelets obtained from exfoliation of the intercalates manufactured according to the invention are outstandingly suitable for the production of sheets and panels having valuable properties. Such sheets and panels may be shaped by conventional processes such as vacuum processing or by hot pressing to form useful objects. The sheets and panels according to the invention are also suitable as coating materials for other materials comprising, for example, wood, glass, ceramic, metal or other plastics, and outstanding strengths can be achieved using conventional adhesion promoters, for example, those based on vinyl resins. The sheets and panels can also be laminated with other plastic films and this is preferably effected by co-extrusion, the sheets being bonded in the molten state. The surfaces of the sheets and panels, including those in the embossed form, can be improved or finished by conventional methods, for example by lacquering or by the application of protective films.

The polymer/platelet composite materials are especially useful for fabrication of extruded films and film laminates, as for example, films for use in food packaging. Such films can be fabricated using conventional film extrusion techniques. The films are preferably from about 10 to about 100 microns, more preferably from about 20 to about 100 microns and most preferably from about 25 to about 75 microns in thickness.

The homogeneously distributed platelet particles and matrix polymer that form the nanocomposites are formed into a film by suitable film-forming methods. Typically, the composition is melted and forced through a film forming die. The film of the nanocomposite may go through steps to cause the platelets to be further oriented so the major planes through the platelets are substantially parallel to the major plane through the film. A method to do this is to biaxially stretch the film. For example, the film is stretched in the axial or machine direction by tension rollers pulling the film as it is extruded from the die. The film is simultaneously stretched in the transverse direction by clamping the edges of the film and drawing them apart. Alternatively, the film is stretched in the transverse direction by using a tubular film die and blowing the film up as it passes from the tubular film die. The films may exhibit one or more of the following benefits: increased modulus; increased wet strength; increased dimensional stability; decreased moisture adsorption; decreased permeability to gases such as oxygen and liquids, such as water, alcohols and other solvents.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A composite material comprising a host material in an amount of about 40% to about 99.95% by weight of the composite material, and about 0.05% to about 60% by weight exfoliated platelets of a phyllosilicate material, said platelets derived from an intercalate formed by contacting a phyllosilicate with an intercalant-containing composition, said composition having a concentration of said intercalant of at least about 2% by weight intercalant, to achieve sorption of the intercalant between adjacent spaced layers of the phyllosilicate to expand the spacing between a predominance of the adjacent phyllosilicate platelets a distance of at least about 10 Å, when measured after sorption of the intercalant, said intercalant selected from the group consisting of (1) an N-alkenyl amide monomer and an allylic monomer; (2) an oligomer formed by copolymerizing an N-alkenyl amide monomer and an allylic monomer; (3) a polymer formed by copolymerizing an N-alkenyl amide monomer and an allylic monomer; and (4) mixtures thereof.

2. A composite material in accordance with claim 1, wherein the concentration of intercalant in said phyllosilicate-contacting composition is at least about 5% by weight.

3. A composite material in accordance with claim 2, wherein the concentration of intercalant in said phyllosilicate-contacting composition is at least about 15% by weight.

4. A composite material in accordance with claim 3, wherein the concentration of intercalant in said phyllosilicate-contacting composition is at least about 20% by weight.

5. A composite material in accordance with claim 4, wherein the concentration of intercalant in said phyllosilicate-contacting composition is at least about 30% by weight.

6. A composite material in accordance with claim 5, wherein the concentration of intercalant in said phyllosilicate-contacting composition in the range of about 50% to about 80% by weight.

7. A composite material in accordance with claim 5, wherein the concentration of intercalant in said phyllosilicate-contacting composition in the range of about 50% to about 100% by weight.

8. A composite material in accordance with claim 1, wherein the concentration of intercalant in the phyllosilicate-contacting composition is initially at least about 16% by weight, based on the dry weight of the phyllosilicate contacted.

9. A composite material in accordance with claim 8, wherein the concentration of intercalant in the phyllosilicate-contacting composition is initially in the range of about 16% to about 70% by weight, based on the dry weight of the phyllosilicate contacted.

10. A composite material in accordance with claim 9, wherein the concentration of intercalant in the phyllosilicate-contacting composition is initially in the range of about 16% to less than about 35% by weight, based on the dry weight of the phyllosilicate contacted.

11. A composite material in accordance with claim 9, wherein the concentration of intercalant in the phyllosilicate-contacting composition is initially in the range of about 35% to less than about 55% by weight, based on the dry weight of the phyllosilicate contacted.

12. A composite material in accordance with claim 9, wherein the concentration of the intercalant in the phyllosilicate-contacting composition is 70% by weight, based on the dry weight of the phyllosilicate contacted.

13. A composite material in accordance with claim 1, wherein the intercalant is a copolymer of an N-alkenyl amide monomer and an allylic monomer.

14. A composite material in accordance with claim 13, wherein the intercalant is a mixture of an N-alkenyl amide monomer and an allylic monomer.

15. A composite material in accordance with claim 1, wherein the intercalant polymer has a weight average molecular weight in the range of about 225 to about 1,000,000.

16. A composite material in accordance with claim 15, wherein the intercalant polymer has a weight average molecular weight in the range of about 225 to about 10,000.

17. A composite material in accordance with claim 1, wherein the host material is a matrix polymer selected from the group consisting of a polyamide; polyvinylimine; polyethylene terephthalate; polybutylene terephthalate; a polymer polymerized from a monomer selected from the group consisting of dihydroxyethyl terephthalate; hydroxyethyl terephthalate; dihydroxybutyl terephthalate; and mixtures thereof.

18. A method of manufacturing a composite material containing about 40% to about 99.95% by weight of a matrix thermoplastic or thermosetting polymer, and about 0.05% to about 60% by weight of exfoliated platelets of a phyllosilicate material, said platelets derived from an intercalated phyllosilicate having an intercalant intercalated between adjacent phyllosilicate platelets comprising:

contacting the phyllosilicate with an intercalant-containing composition comprising at least about 5% by weight of said intercalant polymer, to achieve intercalation of said polymer between said adjacent phyllosilicate platelets in an amount sufficient to space said adjacent phyllosilicate platelets a distance of at least about 10 Å;

combining the intercalated platelets with said thermoplastic or thermosetting polymer, and heating the thermoplastic or thermosetting polymer sufficiently to provide for flow of said thermoplastic or thermosetting polymer and delamination of the platelets of said phyllosilicate; and dispersing of said delaminated platelets throughout said matrix polymer, wherein said intercalant is selected from the group consisting of (1) an N-alkenyl amide monomer and an allylic monomer; (2) an oligomer formed by copolymerizing an N-alkenyl amide monomer and an allylic monomer; (3) a polymer formed by copolymerizing an N-alkenyl amide monomer and an allylic monomer; and (4) mixtures thereof.

19. The method of claim 18, wherein said intercalant polymer-containing composition includes a dissolved polymer carrier comprising about 5% to about 95% by weight organic solvent, based on the total weight of said composition contacting said phyllosilicate.

20. The method of claim 19, wherein said carrier comprises about 5% to about 95% of an aliphatic alcohol.

21. The method of claim 20, wherein said alcohol is selected from the group consisting of methanol, ethanol, and mixtures thereof.

22. A composite material comprising a matrix polymer selected from the group consisting of a thermoplastic polymer, a thermosetting polymer, and mixtures thereof, in an amount of about 40% to about 99.95% by weight of the composite material, and about 0.05% to about 60% by weight exfoliated platelets of a phyllosilicate material, said platelets derived from an intercalate formed by contacting a phyllosilicate, having a water content of at least about 4% by weight, with an intercalant to form an intercalating composition, thereby achieving sorption of the intercalant between adjacent spaced layers of the phyllosilicate to expand the spacing between a predominance of the adjacent phyllosilicate platelets at least about 10 Å, when measured after sorption of the polymer, and thereafter exfoliating the intercalate into a predominance of single platelets; wherein the intercalant is selected from (1) an N-alkenyl amide monomer and an allylic monomer; (2) an oligomer formed by copolymerizing an N-alkenyl amide monomer and an allylic monomer; (3) a polymer formed by copolymerizing an N-alkenyl amide monomer and an allylic monomer; and (4) mixtures thereof.

23. A composite material in accordance with claim 22, wherein the phyllosilicate is contacted with said intercalant in the form of a composition comprising said intercalant and water, and wherein the concentration of intercalant in said intercalating composition is at least about 8% by weight, based on the dry weight of the phyllosilicate.

24. A composition comprising an intercalate, together with an organic solvent, said intercalate formed by contacting a layered material, having a moisture content of at least about 4% by weight, with an intercalant polymer to form an intercalating composition, said intercalate having a weight ratio of polymer to layered material of at least 1:20, to achieve sorption and complexing of the polymer between adjacent spaced layers of the layered silicate material to expand the spacing between a predominance of the adjacent platelets of said layered silicate material to at least about 10 Å, when measured after sorption of the intercalant polymer and drying to a maximum of 5% by weight water; wherein the intercalant polymer is a copolymer of an N-alkenyl amide and an allylic monomer.

25. A composition in accordance with claim 24, wherein the concentration of intercalant polymer in said intercalating composition is at least about 2% by weight.

26. A composition in accordance with claim 24, wherein the concentration of intercalant polymer in said intercalating composition is in the range of about 100%–60% by weight.

27. A composition in accordance with claim 24, wherein the concentration of intercalant polymer in said intercalating composition is at least about 20% by weight, based on the dry weight of layered material in the intercalating composition.

28. A composition comprising an organic liquid selected from the group consisting of monohydric alcohols, polyhydric alcohols and mixtures thereof, in an amount of about 40% to about 99.95% by weight of the composition and about 0.05% to about 60% by weight of the composition of an intercalate, or exfoliate thereof, of a phyllosilicate material, said intercalate formed by contacting a phyllosilicate, having a water content of at least about 4% by weight, with an intercalant to form said intercalate having said intercalant sorbed between adjacent spaced layers of the phyllosilicate and complexed on platelet surfaces of said phyllosilicate to expand the spacing between a predominance of the adjacent phyllosilicate platelets at least about 10 Å, when measured after sorption of the polymer and drying of the intercalate to a maximum water content of 5% by weight, wherein said intercalant is selected from the group consisting of (1) an N-alkenyl amide monomer and an allylic monomer; (2) an oligomer formed by copolymerizing an N-alkenyl amide monomer and an allylic monomer; (3) a polymer formed by copolymerizing an N-alkenyl amide monomer and an allylic monomer; and (4) mixtures thereof.

* * * * *

UNITED STATES PATENT AND TRADEMARK OFFICE
CERTIFICATE OF CORRECTION

PATENT NO. : 5,849,830
DATED : December 15, 1998
INVENTOR(S) : Tsipursky et al.

It is certified that error appears in the above-identified patent and that said Letters Patent is hereby corrected as shown below:

Title page,
US PATENTS, add -- 4,624,982, Alexander 11/86 --.

Column 2,
Line 57, replace "20A" with -- 20Å --

Column 3,
Line 52, replace "50 " with -- 5% --

Column 4,
Line 66, replace "Layered Material,," with -- "Layered Material" -- (quotation marks added).

Column 9,
Line 52, replace "80" with -- 8% --.

Column 10,
Line 2, replace "300 " with -- 30% --.
Line 11, replace "20" with -- 2% --.

Column 15,
Line 63, replace "50°C" with -- 5°C --.

Column 16,
Line 5, replace "$M_n32$ 3260;" with -- $M_n = 3260$; --.
Line 5, replace "Tq" with -- Tg --.
Line 60, replace "250°C. to about 1200°C." with -- 25°C to about 200°C --

Column 17,
Line 10, replace "0.50" with -- 0.5% --.
Line 19, replace "200" with -- 20% -- and replace "100" with -- 10% --.

Column 18,
Line 5, replace "0.01" with -- 0.01% --.

Column 20,
Line 35, replace "KRATONO" with -- KRATON --.

UNITED STATES PATENT AND TRADEMARK OFFICE
CERTIFICATE OF CORRECTION

PATENT NO.   : 5,849,830
DATED        : December 15, 1998
INVENTOR(S)  : Tsipursky et al.

It is certified that error appears in the above-identified patent and that said Letters Patent is hereby corrected as shown below:

Column 21,
Line 35, replace "300" to -- 30% --.
Line 36, replace "700" with -- 70% --.

Column 28,
Line 19, replace "100%" with -- 10% --.

Signed and Sealed this

Twenty-first Day of May, 2002

*Attest:*

*Attesting Officer*

JAMES E. ROGAN
*Director of the United States Patent and Trademark Office*